United States Patent
Anttila

(12) 
(10) Patent No.: US 6,370,394 B1
(45) Date of Patent: *Apr. 9, 2002

(54) SYSTEM AND A METHOD FOR TRANSFERRING A CALL AND A MOBILE STATION

(75) Inventor: Ismo Aleksanteri Anttila, Helsinki (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,324

(22) Filed: Apr. 23, 1998

(30) Foreign Application Priority Data

Apr. 30, 1997 (FI) .................................................. 971844

(51) Int. Cl.⁷ .................................................. H04B 1/38
(52) U.S. Cl. ....................................... 455/556; 455/557
(58) Field of Search ............................... 455/552, 553, 455/556, 557, 558, 465, 462, 422; 379/33, 301, 357, 93.05, 93.09

(56) References Cited

U.S. PATENT DOCUMENTS

| | | | | |
|---|---|---|---|---|
| 4,593,155 A | * | 6/1986 | Hawkins | 455/88 |
| 5,175,758 A | | 12/1992 | Levanto et al. | 379/57 |
| 5,259,017 A | * | 11/1993 | Langmantel | 455/557 |
| 5,349,630 A | | 9/1994 | Sointula | 379/58 |
| 5,446,783 A | * | 8/1995 | May | 455/553 |
| 5,550,907 A | * | 8/1996 | Carlsen | 455/556 |
| 5,636,264 A | | 6/1997 | Sulavuori et al. | 379/56 |
| 5,675,629 A | * | 10/1997 | Raffel et al. | 455/552 |
| 5,774,805 A | * | 6/1998 | Zicker | 455/552 |
| 5,887,266 A | * | 3/1999 | Heinonen et al. | 455/558 |
| 5,913,163 A | * | 6/1999 | Johansson | 455/426 |
| 5,920,815 A | * | 7/1999 | Akhavan | 455/552 |
| 5,991,639 A | * | 11/1999 | Rautiola et al. | 455/553 |

FOREIGN PATENT DOCUMENTS

| | | |
|---|---|---|
| EP | 0 462 728 A3 | 12/1991 |
| EP | 0 599 632 A2 | 6/1994 |
| EP | 0 660 628 A2 | 6/1995 |
| EP | 0758188 A1 | 8/1995 |
| EP | 0 766 427 A2 | 4/1997 |
| GB | 2 282 735 A | 4/1995 |
| GB | 2311911 A | 10/1997 |
| WO | WO 94/17639 | 8/1994 |
| WO | WO 95/31078 A | 11/1995 |

\* cited by examiner

*Primary Examiner*—Nguyen T. Vo
*Assistant Examiner*—Duc Nguyen
(74) *Attorney, Agent, or Firm*—Perman & Green, LLP

(57) ABSTRACT

The present invention is related to a call transfer system and a mobile station (10) connected to it. In the system according to the invention the mobile station (10) is connected to a terminal device (40) for example using a cable (51) or an infrared connection, and the radio sections of the mobile station (10) are switched off. The mobile station (10) is connected to a mobile communication centre (100) or a telephone exchange (110) over the terminal device (40), a local area network (70, 75) and an interconnecting network (80) and a network server (90). Calls are routed based upon identification information, such as for example a IP (Internet Protocol)-address, characteristic of the terminal device (40) stored in the memory of the mobile station (10). If the mobile station (10) is connected to a terminal device (41, 42, 43) other than its own terminal device (40), the own terminal device (40) routes any incoming calls further over the second terminal device (41, 42, 43) to the mobile station (10).

6 Claims, 8 Drawing Sheets

SYSTEM AND A METHOD FOR TRANSFERRING A CALL AND A MOBILE STATION

FIELD OF THE INVENTION

The present invention relates to a system and a method for establishing a telecommunication connection and transferring calls in a telecommunication network and a data transfer network. The invention further relates to a mobile station comprising connecting means for establishing a telecommunication connection and transferring information between the mobile station and said telecommunication network and data transfer network.

BACKGROUND OF THE INVENTION

In modern office work it is necessary to provide the employees with versatile information transfer connections which can transfer speech, facsimile messages, electronic mail and other data—usually in digital form. Transfer of information is needed inside an office or corresponding working environment for communication between employees, for transfer of information between branch offices of an enterprise, which offices can be in other towns or even in other countries, and for communication between the office and "outside world". In this text and all of the following text "office" stands for an environment with several users, which users "belong together", and which office physically covers a reasonably limited area. There has been a trend in the telecommunication branch toward integrated systems in which various forms of telecommunication can be controlled as one entity.

A conventional realization of an above mentioned type of office communication system comprises in order to provide telephone services a company telephone exchange and telephones connected to it typically over twisted-pair connections and a separate local area network (LAN) in which applications for advanced telecommunication services have been implemented and which has the intelligence to run them. The local network is connected to the telephone exchange using a telecommunication server (Telephony Server) which supports the traditional subscriber server architecture in which subscribers are subscribers' computers connected to the local network. For example call-, data-, facsimile-, electronic mail- and speech mail services are connected within an office utilizing the telecommunication server. In an integrated system users can also e.g. control telephone services using their computer terminals connected to the local network. The whole integrated office communication system is connected to public telephone network through the telephone exchange.

FIG. 1 presents an example of a prior known office communication system in which users' telephones TP (TelePhone) have been connected by wire connections and a local area network (LAN) has been connected over a telecommunication server TS (Tele Server) into a telephone exchange PBX (Private Branch Exchange) which is connected to a public telephone network PSTN/ISDN (PSTN, Public Switched Telephone Network, ISDN, Integrated Services Digital Network). To the local area network (LAN) have been connected on one hand servers executing various services such as data base server DBS (Data Base Server), voice server VS (Voice Server) and electrical mail server EMS (Electrical Mail Server) and on the other hand the users' computers PC (Personal Computer). It can be regarded as a problem with this kind of realization that even if a user's telephone TP and computer PC usually are on the same table next to each other separate wire connections must be laid to the user's working room for them, on one hand from the telephone exchange PBX and on the other hand from the telecommunication server TS of the LAN. Building and maintenance of two overlapping telecommunication networks naturally causes cost.

The problem of overlapping telecommunication networks is increased by portable mobile stations utilizing radio connection coming rapidly more popular. Many persons working in an office need, because of their mobile work, a mobile station and often also a combination of a portable computer and a mobile station capable of sending and receiving facsimile messages and E-mail. It is also possible to integrate the above equipment into a so called multiservice mobile station, as an example of which can be mentioned Nokia Communicator 9000. In order to be able to use these devices based on radio connection also inside buildings, the constructions of which attenuate radio signals, it has been suggested that mobile radio networks should be supplemented with small base stations individual for offices or even for rooms, which base stations would be connected either directly or over wired telephone network to the central systems of mobile communication network. The network of small base stations would be already a third overlapping telecommunication network within the same office, and accordingly it is clear that in a preferable solution, which the present invention is aiming at, also the arrangement supporting radio communication stations should be realized using essentially the same means and telecommunication networks than the rest of the transfer of information in the office.

A challenge of its own to telecommunication systems is issued by the fact that work is done more and more in small-office or domestic environment, which is described by the concept SOHO (Small Office, Home Office). Even here advanced office communication services are often needed and it is particularly preferable if such a flexible system is available which can be utilized even both in the office and at home. The present systems which require overlapping connections for the utilization of mobile communication services, conventional telephone services and fast data transfer services are very inflexible for working in a small- or home office. In addition to above, the following kinds of solutions connected with integrated telecommunication systems are known from prior art.

EP publication 599 632 presents a wireless local network designed to replace the present kind of wired local networks (e.g. registered trade marks Ethernet and Token Ring) by a radio transfer network which forms inside an enterprise a private cellular system designed for data transfer. A network utilizing radio connection is, however, relatively expensive to realize and it is more sensitive to interference than a local network based upon wired connections. In addition to that it requires establishing of an extra radio network in addition to previous networks.

EP publication 462 728 presents an intelligent base station controller, subordinated to which at least one radio communication system base station is operating and which is capable of connecting calls from a certain mobile station coming through the base station directly to wired telephone network. This system, however, requires said additional base stations, which increases the cost. The system is also, alike the system presented in publication 599 632, sensitive to external (radio)interference.

If an integrated office communication system is realized utilizing traditional technique, separate wired connections must be laid into a user's working room on one hand from telephone exchange PBX (FIG. 1) and on the other hand from telecommunication server TS of local area network (LAN). Constructing and maintaining two overlapping networks naturally brings extra cost. In said solutions according to prior art a solution to this problem has not actually been striven for.

It is possible to install so called Internet-phone software in computers connected to the nowadays very popular Internet-network. They facilitate the transferring of speech between two computers. Software is available for downloading among other things through the Internet-network as so called Share-Ware software, and their spectrum is wide. They utilize as a user interface the monitor of the computer and an audio card equipped with audio interfaces installed in the computer, and a loudspeaker and a microphone, either separate or integrated in the monitor of the computer. A big problem with these systems is the lack of standardization, i.e. most of the available software is only capable of communicating with another identical software. In said Internet-phone software the speech encoding and decoding are carried out in computers, and accordingly the computers are heavily loaded and the simultaneous running of other programware is disturbed or in the worst case entirely impeded. Internet-phone softwares are fully tied to a local network and to the computer in which they are installed, and accordingly they are not suited for portable operation.

The target of the present invention is to present a flexible system which reduces the problems caused by overlapping networks. Additionally, the purpose of the invention is to reduce problems caused by wireless information transfer inside an office and extra cost. A further target of the invention is to present an arrangement, in which said system, integrating information transfer, can also serve home office- and small office users. A further target of the invention is to present an arrangement of said kind, in which the same devices can be used as terminal devices in the telecommunication system equally well while connected to telecommunication networks realized using line connections in an office as wirelessly outside the office.

SUMMARY OF THE INVENTION

Now a system has been invented for transfer of information, e.g. speech or data, in which the trunk of information transfer is inside the office a local network (e.g. local area network (LAN)), and between office units e.g. a data transfer connection (e.g. an Internet-connection realized using ISDN-lines) utilizing traditional line connections or a fast data packet network utilizing ATM (Asynchronous Transfer Mode) technique. In an information transfer system according to the invention the services normally provided by a telephone exchange and a telephone network have been moved into connection with a local network. As a terminal device in the system it is used a mobile station according to the invention, which operates like a normal mobile station when disconnected. Incoming and outgoing calls are routed by radio based upon the phone number of the mobile station. If the mobile station according to the invention is connected to a system according to the invention, the transferring of calls is moved to be performed over the local network. In this case it is possible to switch off the radio frequency parts of the mobile station according to the invention.

A mobile station according to the invention is connected to a system over a terminal device, typically a computer. The mobile station comprises a separate identification information, based upon which calls are routed while the mobile station is connected to the system according to the invention. Preferably the IP (Internet Protocol)-address of a user's own computer is used as the identification information. Also any other communication address referring to the particular computer may be used. The information transfer within the network is realized using e.g. the TCP/IP (Transmission Control Protocol/Internet Protocol)-protocol prior known to a person skilled in the art.

In a call transfer system according to the invention a network server has been arranged in connection with a mobile telephone exchange, through which server calls intended to a mobile station according to the invention are routed over an interconnecting network, a local area network and a terminal device further to the mobile station, provided that the mobile station is not connected to the mobile communication network by radio. To a mobile telephone exchange the network server and the mobile stations according to the invention connected through it form an interface (e.g. in the GSM-system the A-interface) corresponding with a base station controller, and accordingly no changes need preferably be made in the mobile telephone exchange. The network server emulates a base station controller including signalling. The connecting to or disconnecting from to the mobile communication network through the terminal device, the local area network, the interconnecting network and the network server thus correspond with a handover prior known to a person skilled in the art. The above mentioned routing is facilitated by a database arranged in connection with the network server, in which database it is stored the identification information (e.g. a IP-address) defined for the telephone number of each mobile station according to the invention. The network server also answers for the protocol conversions, prior known to a person skilled in the art, from a circuit switched telephone network to e.g. a packet-switched interconnecting network and vice versa. When a mobile station according to the invention is connected to a terminal device, an application program executed in the terminal device polls the identification (IP—address) of the "own" terminal device of mobile station stored in the mobile station and compares it with its own one. If the IP—addresses match, the terminal device knows that the connected terminal device is an "own" terminal device. In this case both incoming and established calls are transferred based upon the information contained in a database.

If a mobile station according to the invention is connected to a system via a terminal device other than the own computer of the user of the mobile station, the address (IP—address) of the local network in the database situated in connection with a network server no longer corresponds with the real location of the mobile station. In such a case the IP—address contained in the database must be updated to correspond with the real location of the mobile station. It is possible to realize this e.g. by sending to the network server an update-message comprising the identification (IP—address) of the connected mobile station and the IP—address of the computer which it at the moment is connected to.

In a preferable embodiment of the invention the database in connection with a network server need not be updated, but routing is realized using another principle. When the application program running in a terminal device detects that a connected mobile station is a "visiting" one, it transmits a routing message to the "own" terminal device of the visiting mobile station. Based upon the routing message the own terminal device of the visiting mobile station routes incoming calls to the mobile station to the new address. When the visiting mobile station is disconnected from the terminal device, the latter transmits a cancellation message to the own terminal device of the mobile station.

Traditional telephones have been replaced with mobile stations according to the invention, which, while in the office, are connected either using a cable, an infrared connection, or low-power radio transceivers. In this case the traditional radio frequency parts of the mobile station are switched off in a way characteristic of the invention and the mobile station is connected to a data network and through it further to a telecommunication network through a terminal device and a local area network. In this case the mobile station does not contact the telecommunication network using radio frequencies, not loading the mobile communication network, the possibly poor network coverage inside the building does not reduce the quality of the connection, and no cost for using the mobile communication network radio channels is involved.

It is also possible to use the call transfer system according to the invention according to another principle. If the radio frequency parts of the mobile station are not switched off and the radio connection to a mobile communication network is maintained as normal, the connection to a local area network and through it to e.g. Internet-network can be examined exclusively from the point of view of connecting additional services. Accordingly a call transfer system according to the invention facilitates among other things the use of a mobile station as an Internet-telephone without losing the accessibility through a traditional mobile communication network.

A system and method for call transfer according to the invention and a mobile station according to the invention have been characterized in the characterizing parts of the claims.

In connection with the explanation of the invention a subscriber device means terminal devices connected to telecommunication networks and data transfer networks, such as e.g. telephones connected to fixed telephone networks, mobile stations connected to mobile communication networks and for example terminal devices connected to the Internet-network. A subscriber device also means servers connected to telecommunication networks and data transfer networks, such as telephone exchanges and servers offering services through the Internet-network providing services to the users of telecommunication networks and data transfer networks.

In other words, a subscriber device means all the parts of a network with which a telecommunication terminal device (e.g. a telephone) or a data communication terminal (e.g. a computer) can communicate over a telecommunication network or a data transfer network.

In connection with the explanation of the call transfer system according to the invention a call means in a broad sense the transfer of information between two terminal devices over telecommunication connections and data transfer connections, either to one direction or to both directions. In other words, the transfer of information comprises in addition to calls also facsimile messages, GSM short messages and e.g. the downloading of WWW (World Wide Web)-pages over telecommunication networks and data transfer networks.

DETAILED DESCRIPTION OF THE INVENTION

Figure 1:
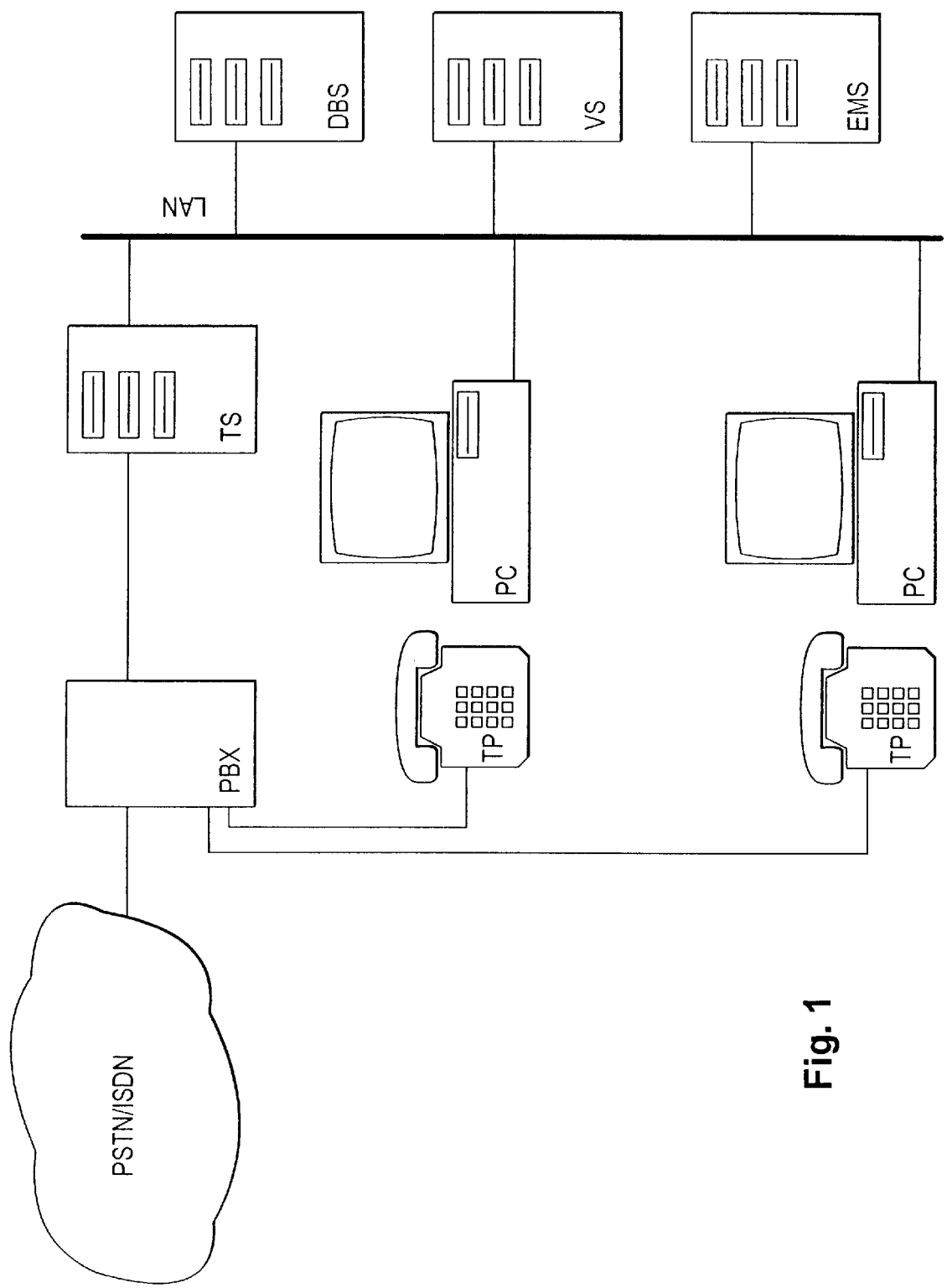
FIG. 1 presents traditional communication networks and terminal devices used in office environment.
Figure 2:
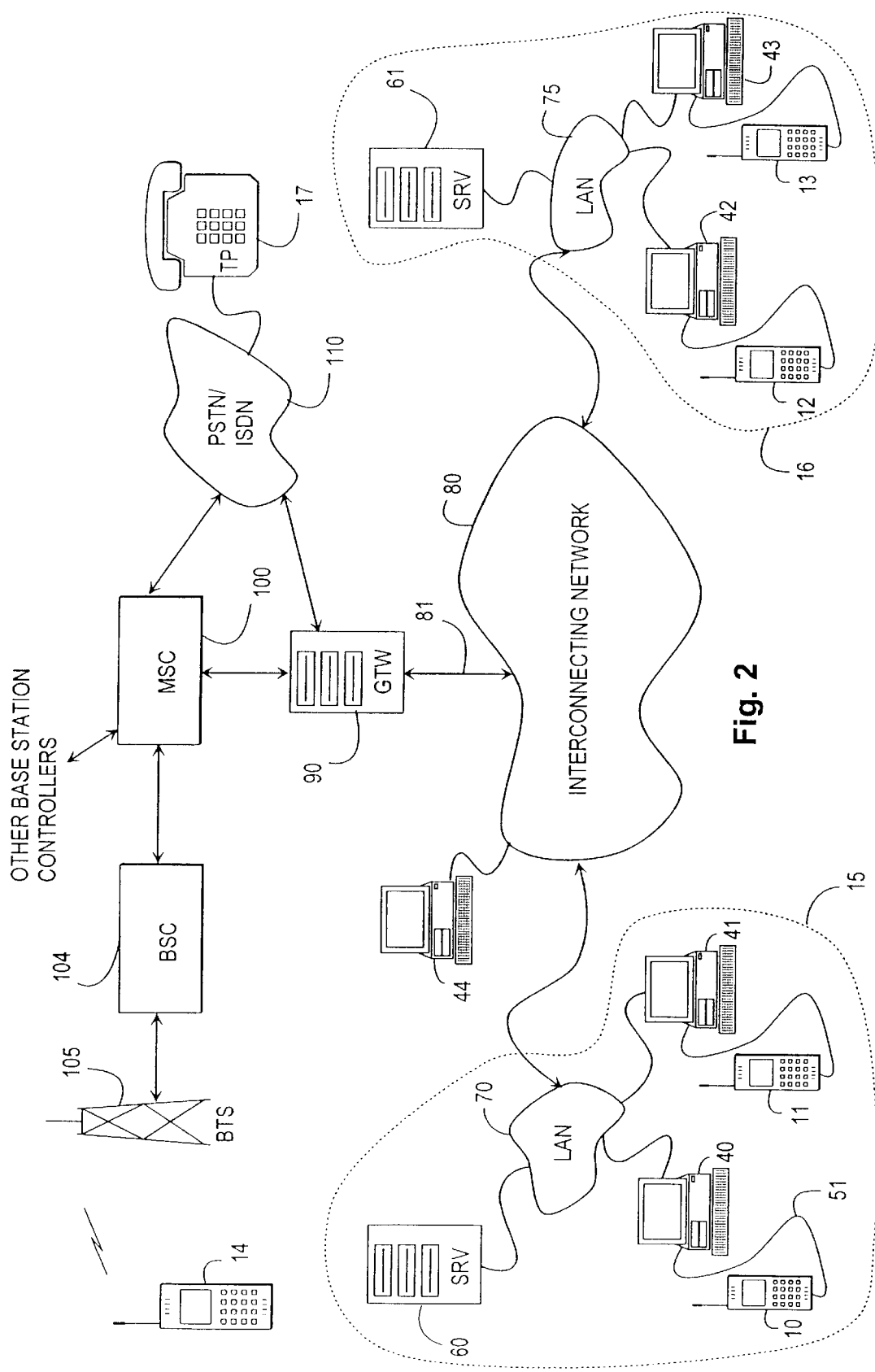
FIG. 2 presents a system according to the invention for transferring calls within a data transfer network and from the data transfer network to telecommunication networks.
Figure 3:
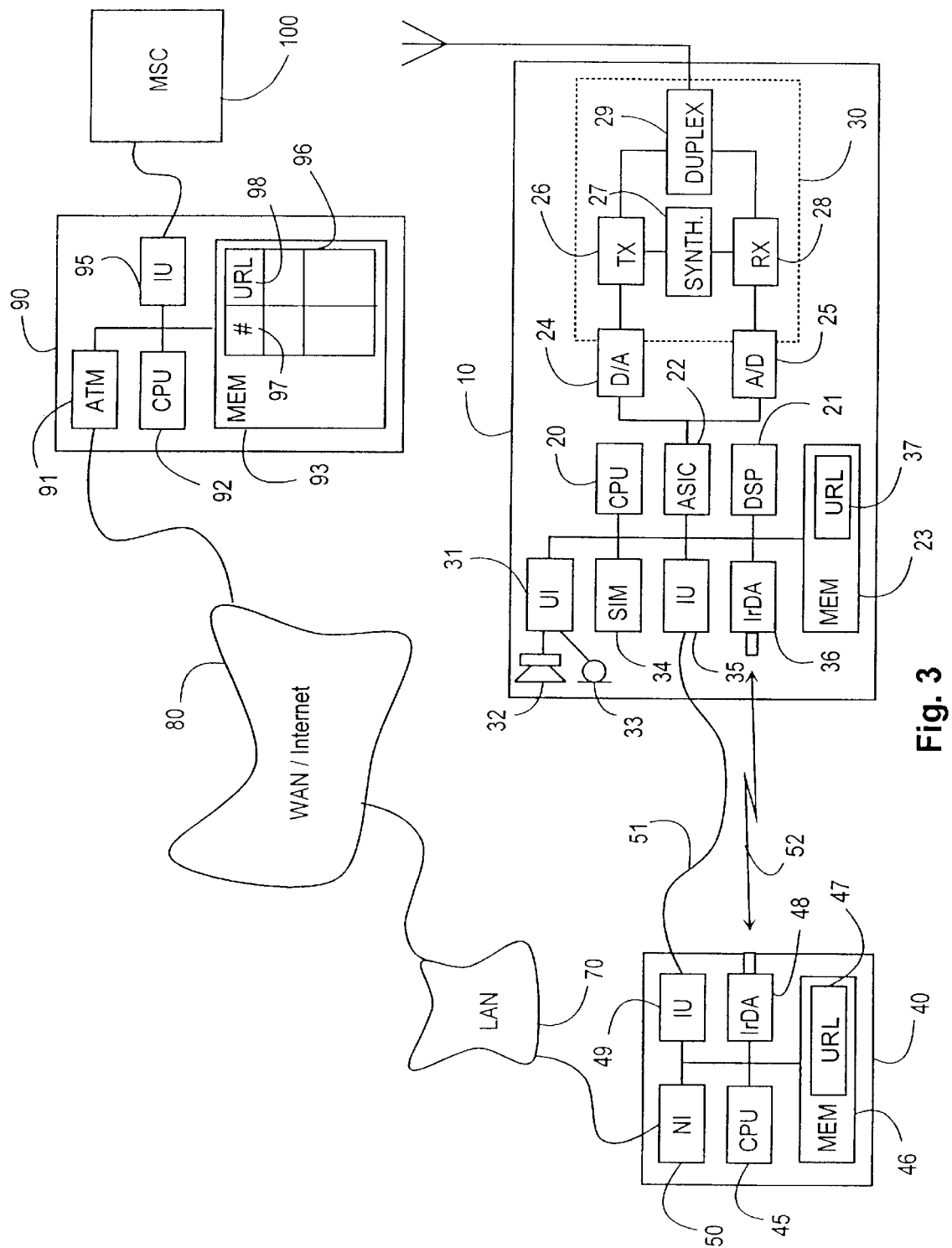
FIG. 3 presents in more detail the structure of the various parts of the information transfer system according to the invention as a block diagram.

FIG. 2 presents an example of a system according to the invention for transferring calls. It comprises two local systems 15 and 16 based upon local area networks (LAN, Ref. 70 and 75), the first of which 15 comprises two computers 40 and 41 and two mobile stations 10 and 11 according to the invention connected to them. In addition to above, server 60 is connected to the first local system 15 to provide typical file services and other services. The second local system 16 has a corresponding structure comprising server 61 connected to local area network 75, computers 42 and 43, and further mobile stations 12 and 13 according to the invention connected to them. The mobile stations according to the invention are connected to the computers either with interconnecting cable 51, or using infrared connection 52 (FIG. 3). It is also possible to use, instead of interconnecting cable 51 or infrared connection 52, low power transceiver units (not shown in the figure) operating at radio frequencies, of which one is placed in mobile station 10, 11, 12, 13 and the other in terminal device 40, 41, 42, 43. The information transfer media used between a mobile station and a terminal does not essentially have an effect on the operation of the call transfer system according to the invention.

In this embodiment of the call transfer system according to the invention local systems 15 and 16 based upon local area networks 70 and 75 have been connected to interconnecting network 80 having a wide geographical coverage. Interconnecting network 80 can be realized using the ATM (Asynchronous Transfer Mode)-technique prior known to a person skilled in the art, or for example using connections based upon the BRI (Basic Rate Interface)—and PRI (Primary Rate Interface)-interfaces of the synchronous ISDN-network. If interconnecting network 80 connects the separate branch offices of a company, and the access of outside persons is prevented, interconnecting network 80 is called a WAN (Wide Area Network)-network. The Internet-network which is open to everybody can equally well be used as interconnecting network 80. From interconnecting network 80 there is further data transfer connection 81 (FIG. 2) through network server GTW (Gateway, Ref. 90) to telephone networks, such as fixed telephone networks 110, such as PSTN (Public Switched Telephone Network)—network and/or the digital ISDN (Integrated Services Digital Network)-multiservice network, and to a mobile communication network, such as e.g. GSM (Global System for Mobile Communication)-network. To fixed telephone networks 110 there are connected terminal devices, such as telephone 17, and in the mobile communication network conventional mobile station 14 over mobile communication center 100 (MSC, Mobile Switching Centre), base station controller 104 (BSC, Base Station Controller) and base station 105 (Base Transceiver Station).

In the above described call transfer system according to the invention it is possible to transfer calls between different terminal devices connected to system based upon the identification information characteristic of the terminal devices. In this exemplary embodiment the IP—address prior known from the Internet-network is used as the identification information, and as a data transfer protocol in local area networks 70 and 75 and in interconnecting network 80 the TCP/IP-protocol is used up to network server 90. From network server 90 onwards to telephone networks 110 and mobile communication center 100 it is used a data transfer connection according to G.703-protocol, prior known to a person skilled in the art. The protocol conversion required between the circuit switched G.703-based—and the packet switched TCP/IP-based data transfer is performed in network server 90 having sufficient memory 93 (FIG. 3) for the buffering of the data to be transferred, in a way prior known to a person skilled in the art.

FIG. 3 presents the constructional parts of mobile station 10, terminal device 40 and network server 90 according to the invention. Mobile station 10 according to the invention resembles for its structure a conventional mobile station, e.g. a GSM—mobile station. It comprises among other things processor 20 controlling the functions of mobile station 10, signal processor 21 executing mainly time-critical operations, ASIC (Application Specific Integrated Circuit)-block 22, memory 23, D/A-converter 24, A/D-converter 25 and radio frequency part 30.

Mobile station 10 operates independently, that is when not connected to terminal device 40, exactly like ordinary mobile station 14. The functions performed by mobile station 10 have then been shared between processor 20 and signal processor 21 for example in such a way that processor 20 carries out mainly operations essential for communication between the mobile station and a base station requiring versatile processing, such as mobility management (e.g. change of base station), management of radio frequencies (transmission and reception frequencies) and call control (processing of outgoing and incoming calls). Correspondingly, signal processor 21 executes sequences requiring real time processing of incoming and outgoing signals, such as channel encoding and channel decoding, interleaving and de-interleaving, and ciphering and deciphering. Mobility Management, management of radio frequencies (Radio Resource Management), control of calls (Call Control), channel coding (Channel Coding), interleaving and de-interleaving, ciphering and de-ciphering are functional blocks prior known to a person skilled in the art.

In this embodiment of the call transfer system according to the invention it is possible to connect mobile station 10 and terminal device 40 to each other in a number of methods. One of the methods is to interconnect the devices using a mechanical wire connection using interface units IU (Interface Unit, FIG. 3, references 35 and 49). The interconnection interface can be e.g. a serial port prior known to a person skilled in the art. Some advantages of a physical cable connection are among other things the safe operation and the logical use, because a user directly sees whether mobile station 10 is connected to terminal device 40 or not. Another method of connecting mobile station 10 to terminal device 40 is to use e.g. wireless transfer 52 carried out in infrared wavelength range. A very common, and suitable for the purpose, data transfer protocol is IrDA (infrared Data Association)-protocol prior known to a person skilled in the art. In this case data transfer 52 taking place in the infrared wavelength range is realized between infrared transceivers 36 and 48. It is also possible to realize the connection using low-power radio frequency transceiver units (not shown in the figure).

Terminal device 40 is e.g. a PC prior known from office environment or a workstation, which comprises among other things processor 45, memory 46 and network interface unit 50 (NI, Network Interface) for connecting terminal device 40 to local area network LAN (Ref. 70). Local area network 70 has a further connection to interconnecting network 80, and through it further to network server 90. The call transfer system according to the invention is connected to mobile telephone centre 100 over network server 90. The network server comprises among other things processor 92, interface unit 91 for the connecting to interconnecting network 80, memory 93 and interface unit 95 for the connecting of network server 90 to mobile switching centre 100. Data transfer from network server 90 to the mobile telephone centre is carried out over a circuit switched connection, and the transfer of information is performed based upon the telephone number of the mobile station. Correspondingly, the transfer of information from the network server to the interconnecting network is performed typically over a packet switched data transfer connection based upon a IP—address. In order to make it possible to transfer information from a certain telephone number to a certain IP—address, reference table 46 is required. It comprises telephone number 97 characteristic of each mobile station according to the invention and IP—address 98 corresponding to it. In this exemplary embodiment the reference table is stored in memory 93 of network server 90.

When mobile station 10 is connected to terminal device 40 in a way characteristic of the invention, e.g. using cable 51 or infrared connection 52, several sub-functions of a traditional mobile station need preferably not be carried out. Among other things, radio frequency section 30 can be switched off, because in this case calls and other data are transferred over line connections. Switches K5 to K7 (FIG. 4) then interrupt the power supply from power supply unit 39 to radio frequency part 30, and possibly also to signal processor 21 and ASIC-block 22. The required processing capacity is significantly reduced, and accordingly depending on the processing capacity required, processor 20 can reduce the frequency of the clock signal transferred to signal processor 21 and ASIC-block 22 by controlling the operating of clock generator 38 in order to save power.

Figure 4:
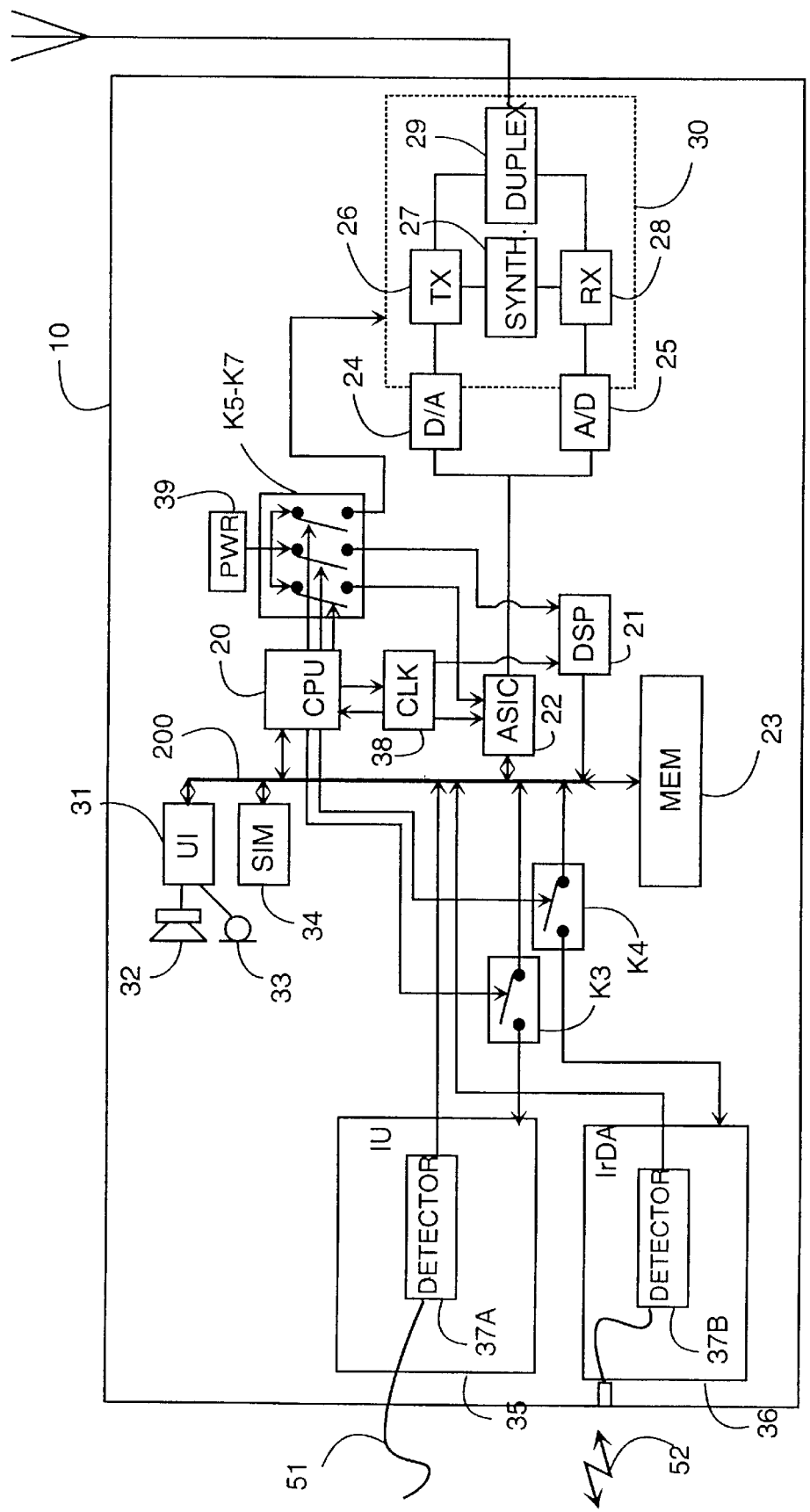
FIG. 4 presents the structure of a mobile telephone according to the invention as a block diagram.

The connecting of mobile station 10 and terminal device 40 is detected by both terminal device 40 and mobile station 10 and, depending on the connecting method used, the connecting can be detected in a number of methods. When e.g. multi-core interconnecting cable 51 is used, one of the cores can be allocated for the indication signal. If e.g. in terminal device 40 said indication signal is connected to operating voltage (e.g. +5 V), mobile station 10 detects the connecting of mobile station 10 by monitoring the voltage level of the indication signal e.g. using level detector 37A (FIG. 4). Level detector 37A transfers the information e.g. over internal bus 200 to processor 20 controlling the system, controlled by which mobile station 10 and terminal device 40 go over to using wired information transfer connection over cable 51. A physical connection within mobile station 10 is established when processor 20 orders switch K3 to close. In order to save power, processor 20 can in this case switch off infrared transceiver 36 by opening switch K4 (if it was closed). In a corresponding way terminal device 40 can detect the connecting to mobile station 10 by monitoring an indication signal of the same type, the signal level of which a program installed in terminal device 40 polls in interface unit 49 at certain, predetermined intervals. Because said computer program executed in processor 45 and memory 46 can be run in the background, it does not have an essential effect in the other functions of terminal device 40. When the cable between mobile station 10 and terminal device 40 is disconnected, the processor of terminal device 40 detects the disconnection from interface unit 48, and processor 20 of mobile station 10 from interface units 35 using detector 37A. The connection can also be switched off manually from the user interface of terminal device 40 or from the user interface of mobile station 10.

If the connection between mobile station 10 and terminal device 40 is realized using an infrared connection, there also is a number of ways for detecting the connection. When the widely used IrDA (Infrared Data Association)-protocol is used, the connection is detected e.g. based upon IAS (Information Access Service)-service, obligatory for devices according to IrDA standard, using detector 37B. IAS-service means a handshake operation between a device (in this application mobile station 10) and a server (in this application terminal device 40) in which a device can ask a server about services available. The most important information transferred at handshake is LSAP ID (Link Service Access Point), which defines the connection point at which the required service is available. It is this information that is required for a successful establishing of a connection. Processor 20 selects IrDA-connection 52 to use by closing switch K4. The cable connection is disconnected if required with switch K3. When infrared connection 52 is used, disconnection of connection 52 is detected correspondingly using infrared transceivers 36 and 48. If the connection is established using low-power transceiver units operating on radio frequency, the establishing and disconnection of a connection takes place according to a corresponding principle.

The following is the description of the operation of one embodiment of the information transfer system according to the invention when mobile station 10 has been successfully connected to terminal device 40, either using cable 51, infrared connection 52 or a pair of low-power radio transceivers. In order to interconnecting network 80 and local networks 70 and 75 connected to it to be able to route calls (or other data in digital form, such as e.g. SMS- short messages) of mobile stations 10, 11, 12, 13 connected to terminal devices 40, 41, 42, 43 within the call transfer system according to the invention or from the call transfer system to mobile telephone centre 100 or to fixed telephone networks 110, the identification information (in this case the IP—address) of the terminal device 40 to which mobile station 10 is connected must be known. This is not a problem if mobile station 10 according to the invention is always connected to the same terminal device 40. In such a case it is possible to define in connection with the installing of the application software to be installed in terminal device 40 that if a call comes in through local area network 70 to terminal device 40, and mobile station 10 is connected to terminal device 40, the service is automatically activated. For example a message about an incoming call is transferred to the user (B-subscriber) through the monitor of terminal device 40. If a normal call is concerned, and the user (B-subscriber) answers, the transfer of the call between A-subscriber (e.g. telephone 17) and (B-subscriber) through terminal device 40, local area network 70, interconnecting network 80, network server 90 and telephone network 110 is started. If mobile station 10 establishes a call, subscribers connected to local area networks 70 and 75, and interconnecting network 80 are reached based upon the IP—address , and those connected to telecommunication networks 100 and 110 based upon the telephone number. It is possible to transfer speech in local area network 70 and interconnecting network 80 e.g. coded using a coding method based upon the RPE-LTP (Regular Pulse Excitation- Long-Term Prediction) technique according to the ETSI (European Telecommunication Standards Institute)-standard prior known to a person skilled in the art from GSM-mobile telephones. This same coding method is applied in the GSM-system also on speech transfer by radio. It codes the speech for 13 kbps line speed. In telephone network 110 it is normally used a coding method based upon PCM (Pulse Coded Modulation)-technique operating at 64 kbps line speed. Accordingly the conversion, prior known to a person skilled in the art, from RPE-LPE coded speech into the PCM-coded mode and vice versa must be performed e.g. in network server 90. It would be equally possible to perform the transform in mobile station 10 according to the invention, or in terminal device 40, but in that case local area network 70 and interconnecting network 80 are loaded more heavily. On the other hand, the advantage of this solution is that network server 90 does not need to perform eventually several coding conversion operations.

Above it was described such a situation in which mobile station 10 according to the invention was connected to telecommunication networks through its "own home terminal device" 40. If instead mobile station 10 according to the invention is connected to terminal device 41, 42, 43 other than its own home terminal device 40, some operations characteristic of the invention must be performed in order to route an incoming call. In order to facilitate these operations terminal device 40, 41, 42, 43 must be capable of identifying mobile station 10, 11, 12, 13 connected to it. This identification is in this embodiment of the invention performed based upon IP—address 47 of the own terminal device 40 of mobile station 10, which address is stored in memory 23 (FIG. 3, ref. 37) of mobile station 10. The storing of the IP—address 47 of home terminal device is carried out e.g. when the application program of terminal device 40, 41, 42, 43 is installed. It is also possible for the user of mobile station 10, 11, 12, 13 to edit IP—address 37 using the keyboard and display of the mobile station user interface. In the following it is described the operation of the call transfer system according to the invention from the point of view of terminal device 40 with references to the flow diagram presented in FIG. 5 and to FIG. 3.

Figure 6A:
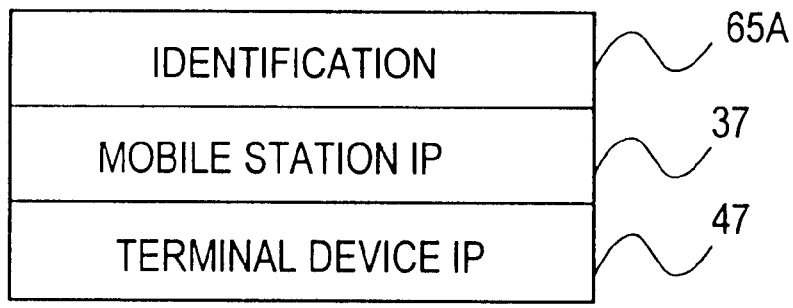
FIGS. 6A, 6B and 6C present messages used in a call transfer system according to the invention and the structure of said messages.
Figure 6B:
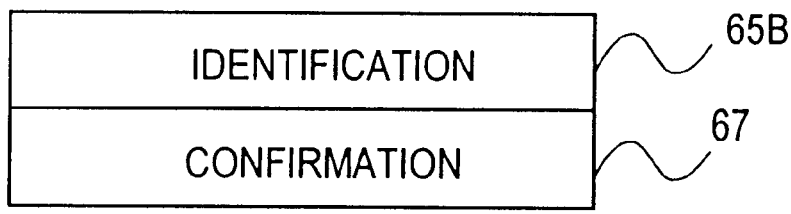
Figure 7:
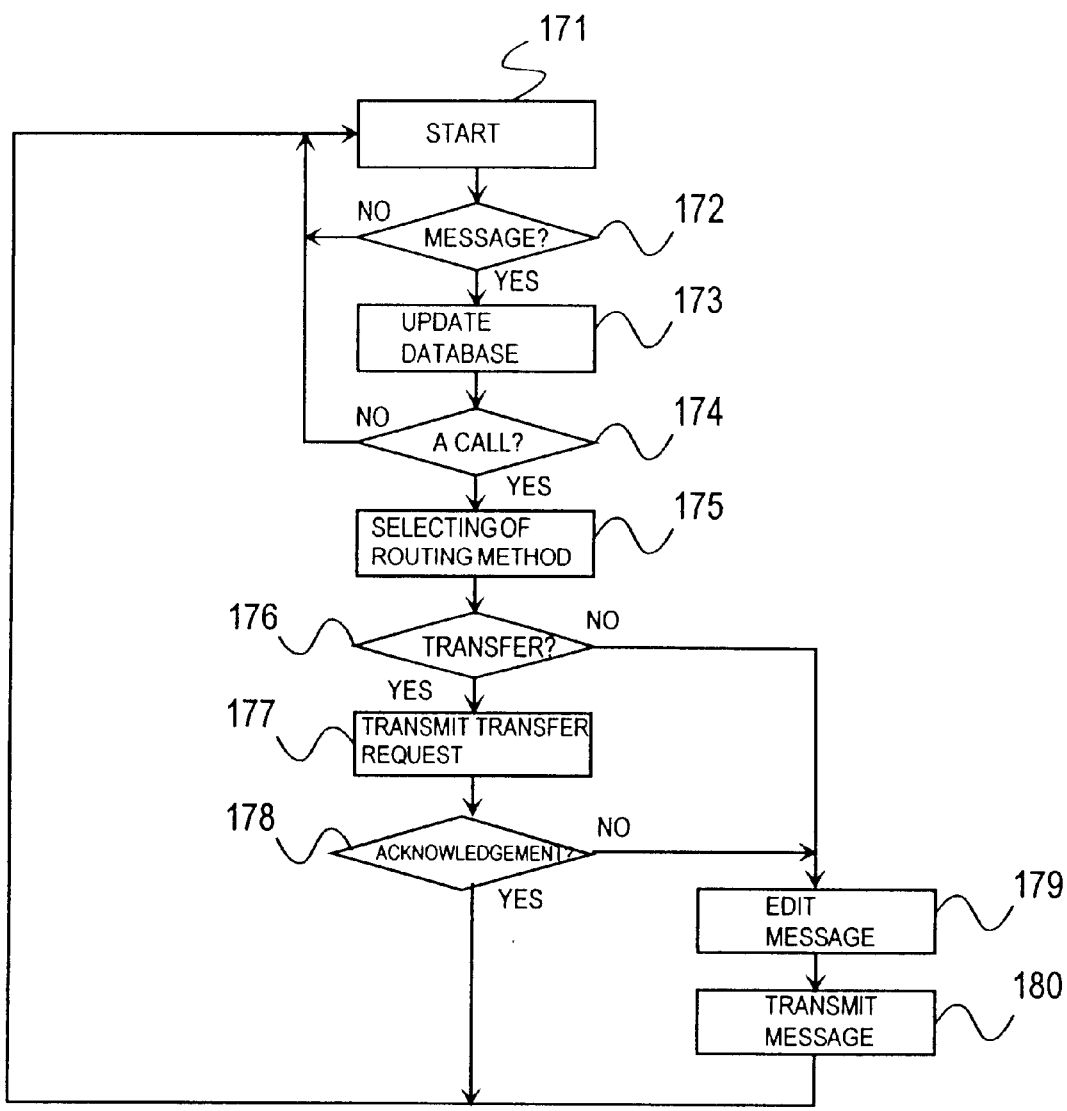
FIG. 7 presents as a flow diagram the transferring of calls performed in a terminal device according to the invention.

In initial step 150 no mobile station 10, 11, 12, 13 according to the invention is connected to terminal device 40. The application program executed in processor 45 of terminal device 40 polls at certain, predetermined intervals interface unit 49 and infrared transceiver 48 in order to check whether any mobile station 10, 11, 12, 13 according to the invention is connected to terminal device 40 (step 151). If this is not the case, the execution of the application program returns to initial step 150. If the connecting of mobile station 10, 11, 12, 13 is detected, the executing of the application program is continued from step 152, in which it is read IP—address 37 of home terminal device 40, stored in memory 23 of the mobile station. In step 1153 it is checked, if required, whether mobile station 10, 11, 12, 13 connected to terminal device 40 has the right of use in the system by comparing the read IP—address 37 with the database stored in memory 46 of terminal device 40. If access is denied, the connection is rejected and the execution of the application program returns to initial step 150. If instead the right of use is in order, the executing of the application program is continued from step 154, in which it is identified whether mobile station 10, 11, 12, 13 connected to terminal device 40 is "own" mobile station 10 or "visiting" mobile station 11,12, 13. The identification is performed comparing IP—address 37 stored in the memory of mobile station 10 with IP—address 47 of terminal device 40. If own mobile station 10 is concerned (IP—addresses 37 and 47 match), the connection is accepted and the execution of the program goes to step 159, in which the activity of the telecommunication connection is checked. Step 159 is explained in more detail later on. If on the other hand visiting mobile station 11, 12, 13 is concerned, the execution of the program goes to step 156. In step 156 it is formed in terminal device 40 routing message 64 presented in FIG. 6A, which message is transferred further to own home terminal device 41, 42, 43 of visiting mobile station 11, 12, 13 preferably over local area network 70, 75 and interconnecting network 80. Alternatively it is also possible to initially transfer routing message 64 from visiting mobile station 11, 12, 13 by radio e.g. as a SMS (Short Message Service)-message over base station 105, base station controller 104 and mobile communication centre 100 to network server 90. Network server 90 now performs the required protocol- and address conversions, and transfers routing message 64 further over interconnecting network 80 and finally over local area network 70, 75. Routing message 64 is transmitted preferably based upon IP—address 37 stored in the memory of the mobile station, but it would be equally possible to use another type of identification, such as the telephone number of mobile station 11, 12, 13. Routing message 64 includes identification 65A for the identifying of the routing message, IP-identification 37 of the home terminal device of mobile station 11, 12, 13 and IP-identification 47 of the terminal device 40, to which mobile station 11, 12, 13 according to the invention is connected. When own terminal device 41, 42, 43 of mobile station 11, 12, 13 receives routing message 64, the transfer process of calls coming to of mobile station 11, 12, 13 is changed. The transfer process is described in more detail in connection with the explanation of FIG. 7. In order to ensure the going through of routing message 64, terminal device 41, 42, 43 transmits receipt message 66 (FIG. 6B) back to terminal device 40. Receipt message 66 contains for example identification 65B, and by comparing it with identification 65A terminal device 40 detects, which message the receipt is connected with, and self confirmation field 67. In confirmation field 67 it is placed the information about whether the reception of the routing message was successful or not. If receipt message 66 informs about problems occurred at the reception of routing message 64 or the execution of the routing (step 158), the connection is rejected and the executing of the application program returns to initial step 150. If, on the other hand, the routing was successful, the executing of the application program is continued from step 159.

Figure 6C:
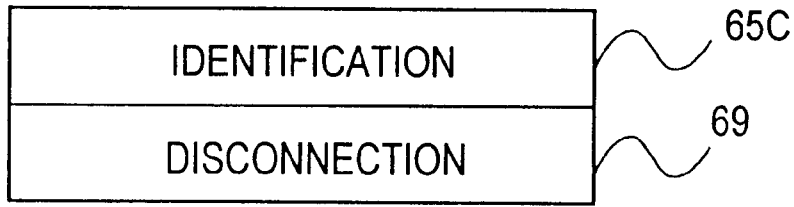

In step 159 it is checked if there is a call coming in to terminal device 40 from local area network 70 or if the user of mobile station 11, 12, 13 is forming an outgoing call. If there is no incoming call, and or if the user of mobile station 11, 12, 13 is not forming a call, the executing of the application program moves into step 163. In step 163 it is checked if mobile station 11, 12, 13 still is connected to terminal device 40. If this is the case, the executing of the application program returns to step 159. If connected mobile station 11, 12, 13 was visiting mobile station 11, 12, 13, and no connection between visiting mobile station 11, 12, 13 and terminal device 40 can be found any longer, terminal device 40 transmits cancelling message 68 (FIG. 6C) to own terminal device 41, 42, 43 of visiting mobile station 11, 12, 13 (step 165). Cancelling message 68 includes identification information 65C and information field 69 itself, in which it informs that mobile station 11, 12, 13 no longer is connected to terminal device 40. In this case it is no longer attempted to reach mobile station 11, 12, 13 through terminal device 40, but by radio or in IP—address 47 indicated by new routing message 64.

If an incoming call is detected in step 160, or if the user of mobile station 11, 12, 13 is forming a call, the call is processed in step 161 in the same way independent of whether own mobile station 10 or visiting mobile station 11, 12, 13 has been connected to terminal device 40. This is based upon the call being routed based upon IP—address 37 stored in the memory of mobile station 11, 12, 13. The routing of incoming calls performed in terminal devices 40, 41, 42, 43 is described in form of a flow diagram in FIG. 7.

In initial step 171 terminal devices 40, 41, 42, 43 monitor the traffic in local area network 70, 75. If a message comes to the concerned terminal device (e.g. terminal device 41), for example routing message 64, it is stored in the memory of terminal device 41 in question (stages 172 and 173). If the received message is a call intended to mobile station 11 (step 174), mobile station 11 is connected to terminal device 40 instead of terminal device 41, and routing message 64 from terminal device 40 to terminal device 41 has been transferred successfully, terminal device 41 can route the call in a way characteristic of the invention. In the following the routing is described using two exemplary embodiments.

The first possibility is to receive all messages intended to mobile station 11 and forward them as they are to terminal device 40 and further to mobile station 11 connected to it. In this case the received message (call) is modified (step 179) in such a way that the address information of the received message is replaced with IP—address 47 of terminal device 40. The modified message is forwarded to terminal device 40 and mobile station 11. This is a simple and straightforward method. Another possibility is to transmit to the sender of the message (A-subscriber, e.g. mobile station 14) a follow-me request message (step 177), in which it is informed that desired mobile station 11 can, differing from the IP—address of terminal device 41, be reached in IP—address 47 of terminal device 40. If the A-subscriber acknowledges the successful call transfer (step 178), any future call transfers will be carried out directly between the A-subscriber and terminal device 40. If no acknowledgment is received, terminal device 41 transfers the call in the way described in connection with stages 179 and 180.

Figure 5:
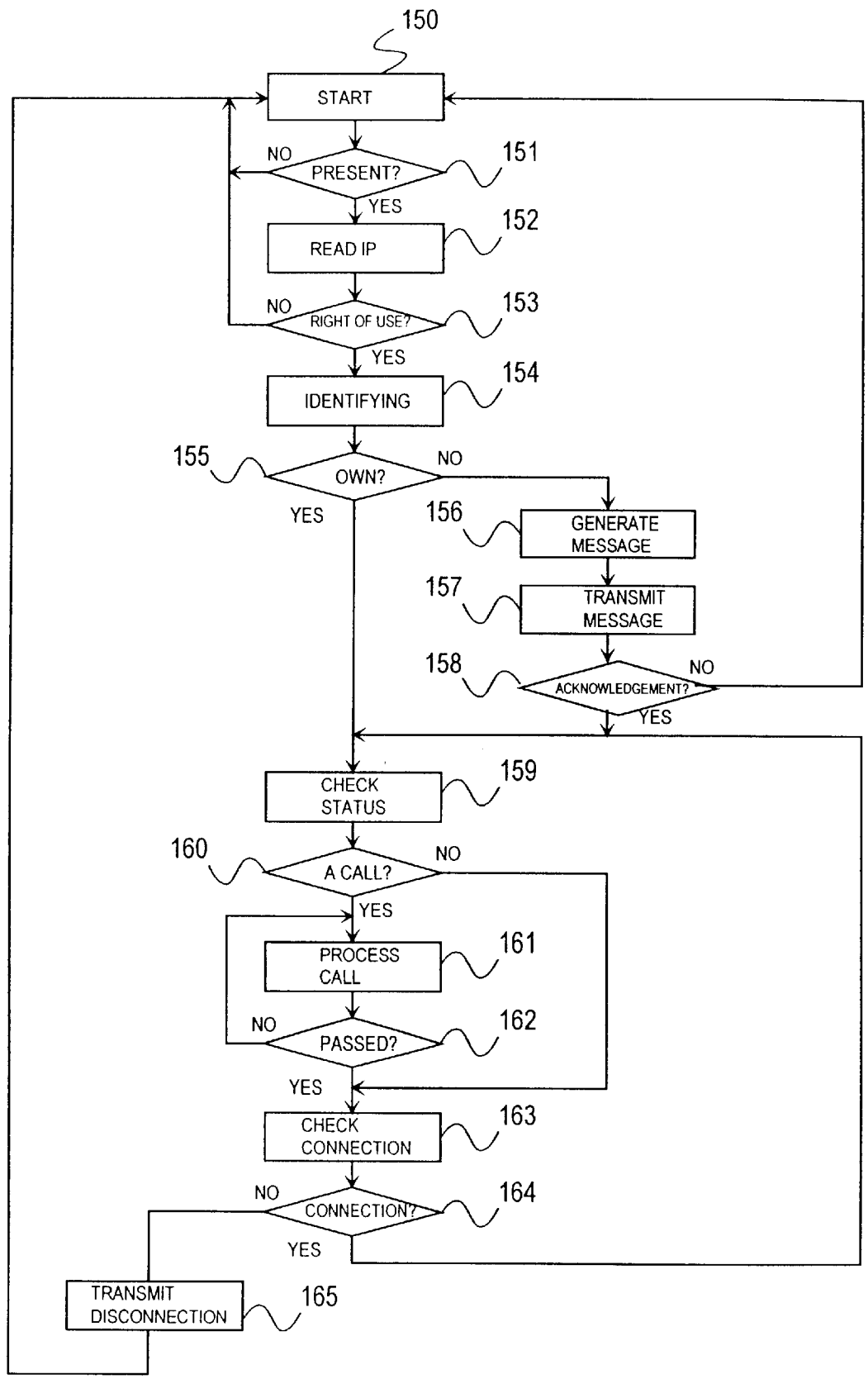
FIG. 5 presents the function of a terminal device according to the invention in the form of a flow diagram.
Figure 8:
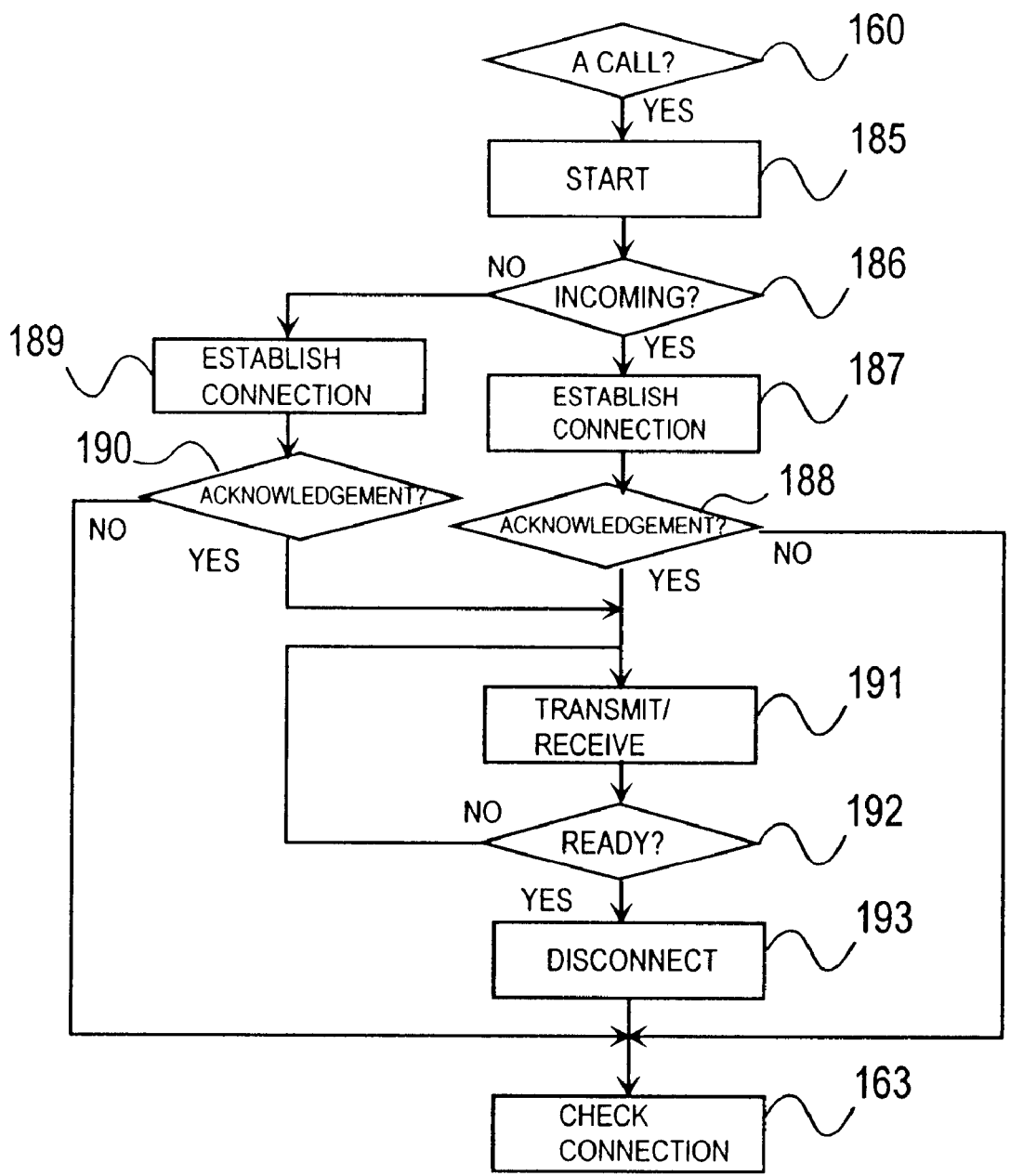
FIG. 8 presents the processing of an incoming call or of a call to be formed in the form of a flow diagram.

The above was a description of transferring an (incoming) call from the point of view of terminal device 41 when mobile station 11 was connected to terminal device 40 instead of its home terminal device 41. In the following the function of the invention call is described from the point of view of terminal device 40 in connection with both incoming and outgoing calls. FIG. 8 presents in more detail the function of the "process calls"-block presented in FIG. 5 as a flow diagram. In initial step 185 a function mode is selected based upon whether an incoming or outgoing call is in question. In both cases it is started a connection establishing procedure (stages 187 and 189), the purpose of which is to establish between mobile station 10, 11, 12, 13 connected to terminal device 40, 41, 42, 43 and an external terminal device, for example mobile station 14, over local area network 70, interconnecting network 80 and mobile communication network 90, 100, 104, 105. The establishing of a connection is confirmed using acknowledgment messages (stages 188 and 190). If no acknowledgment is received, the executing of the application program returns to step 163 (FIGS. 5 and 8). After the successful establishing of a connection the executing of the program moves to a stage in which it transmits and receives messages in order to maintain the call connection (step 191). Depending on the character of the information to be transferred the connection may be a one-way or a two-way connection, and of circuit switched or packet switched type. When the desired information has been transferred, the connection is cancelled using connection cancelling message 193, and the executing of the program moves to step 163.

When mobile station 10, 11, 12, 13 is connected through terminal device 40, 41, 42, 43 to local area network 70, 75 and further through interconnecting network 80 to telecommunication networks, mobile station 10, 11, 12, 13 operates like a telephone of a line network and the radio parts typical of a mobile station need not be used for information transfer. When the connection of mobile station 10 to terminal device 40 is broken, radio frequency part 30, ASIC-block 22 and signal processor 21 are activated to the normal operating state (FIG. 4) by processor 20 of mobile station 10 with the help of power supply unit 39 and clock generator 38. Mobile station 10 searches best base station 105 in the way prior known to a person skilled in the art, and transmits its registering to the mobile communication network by radio over base station 105 and further through base station controller 104. When the connection is broken, terminal device 40 sends to network server 90 a message, which informs that mobile station 10 no longer can be reached through to network server 90. Based upon this information network server 90 generates a signalling message and forwards it to mobile communication centre 100. If the mobile communication centre is based on the GSM-system, network server 90 resembles, from the point of view of mobile communication centre 100, base station controller 104 connected through A-interface prior known to a person skilled in the art. In this way the change of information transfer connection from one by line network to one by radio corresponds with a handover, and accordingly mobile station 10 according to the invention can, after disconnecting from terminal device 40, transmit and receive calls over base station 105 like normal mobile station 14.

When processor 20 controlling the operation of mobile station 10 has detected a successful connecting to terminal device 40 it switches off among other things radio frequency section 30, because hereafter the transferring of calls to mobile station 10 shall be carried out over terminal device 40. In this embodiment of mobile station 10 according to the invention processor 20 switches off radio frequency section 30 by disconnecting the power supply from power supply unit 39 using switch K7 (FIG. 5). Radio frequency section 30 comprises among other things D/A-converter 24, A/D-converter 25, transmitter part 26, receiver part 28, synthesizer 27 and duplex filter 29. The switching off of radio frequency section 30 eliminates problems caused by wireless information transfer inside an office, such as interference, and blockings met by several users in a small area, and avoids extra cost caused by the use of radio network. In addition to the switching off of radio frequency section 30, the processing capacity required by mobile station is reduced, because of which the clock signals of processor 20, and in particular those of signal processor 21 and ASIC-block 22 can be reduced, or temporarily even be fully stopped. Processor 20 controls the clock signals by controlling the operation of clock generator 38. If the services provided by signal processor 21 and ASIC-block 22 are not required at all, it is possible to cut off the power supply using switches K5 and K6. Together these two operations significantly reduce the need of energy of mobile station 10 and thus the operating time of mobile station 10 according to the invention is long when connected to terminal device 40, up to several weeks or months. If mobile station 10 is connected to terminal device 40 using connection cable 51, it is possible to arrange also a charging voltage in connection with the connection cable, in which case the battery (not shown in the figure) of the mobile station is charged while it is connected to terminal device 40.

The above is a description of the realization of the invention and its embodiments utilizing examples. It is self evident to a person skilled in the art that the invention is not limited to the details of the above presented embodiments and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

What is claimed is:

1. A system for transferring information comprising:
   at least one mobile station; and
   at least one subscriber device; wherein the mobile station is adapted to be operatively connected to the subscriber device over a mobile communications network for transferring information between the mobile station and the subscriber device; and
   at least one local system comprising:
      at least one computer system, the mobile station adapted to be operatively coupled to the computer system;
      a local area network operatively coupling each computer device in the local system to each other; and
      an interconnecting network operatively coupling each local system to each other;
   a network server operatively coupled between the interconnecting network and the telecommunication network, the network server adapted to transfer data from the mobile station to the subscriber device over the telecommunications network via the interconnecting network based upon a telephone number of the subscriber device, and to transfer information from the subscriber device over the telecommunications network to the local system via the interconnecting network based upon identification information characteristic of a computer of the computer system.

2. The system of claim 1 wherein the network server further comprises a reference table adapted to include the telephone number corresponding to each mobile station and the internet protocol address corresponding to each mobile station and to convert the phone number into the corresponding internet protocol address.

3. The system of claim 1 wherein when the mobile station is operatively connected to the computer device, at least one mobile station function of the mobile station is disabled.

4. The system of claim 1 wherein the network server is further adapted to convert speech being transferred between the local system and the telecommunications network from regular pulse excitation-long term prediction to pulse coded modulation and from pulse coded modulation to regular pulse excitation-long term prediction.

5. A method for transferring information between a mobile station and a subscriber device comprising the steps of:

detecting that the mobile station is operatively connected to a computer device in a local system;

determining if the mobile station operatively connected to the computer device is an authorized mobile station by comparing the identification information characteristic of a computer of the computer system stored in the mobile station with identification information stored in the computer device;

transmitting a call transfer routing message if the mobile station connected to the computer device is a visiting mobile station;

routing a call to the mobile station operatively connected to the computer device from the subscriber device in a telecommunications network and routing the call from the telecommunication network through a packet switched data network to the computer device associated with the mobile station as identified by the identification information.

6. The method of claim 5 further comprising the step of detecting that the mobile station is not connected to the computer device and activating a mobile telephone service of the mobile station, wherein when a telephone call is routed to the computer device the computer device is adapted to reroute the call back to the mobile station via a mobile communications network.

* * * * *